United States Patent [19]

Inamine et al.

[11] 3,770,590

[45] Nov. 6, 1973

[54] FERMENTATION PROCESS

[75] Inventors: Edward Inamine, Rahway; Jerome Birnbaum, Marlboro Township, both of N.J.

[73] Assignee: Merck & Co., Inc., Rahway, N.J.

[22] Filed: Dec. 1, 1971

[21] Appl. No.: 203,838

Related U.S. Application Data

[63] Continuation-in-part of Ser. No. 145,558, May 20, 1971, abandoned.

[52] U.S. Cl. .................. 195/80, 195/36, 260/243 C
[51] Int. Cl. .............................................. C12k 1/00
[58] Field of Search ........................... 195/36 R, 80

[56] References Cited
UNITED STATES PATENTS
3,436,310   4/1969   Arnold et al. ................... 195/36 R Primary Examiner—A. Louis Monacell
Assistant Examiner—Robert J. Warden
Attorney—Rudolph J. Anderson, Jr., J. Jerome Behan and Julian S. Levitt

[57] ABSTRACT

Increased yields of the antibiotic 7-(D-5-amino-5-carboxyvaleramido)-3-(carbamoyloxymethyl)-7-methoxy-3-cephem-4-carboxylic acid are obtained by the addition of sodium thiosulfate and/or $\alpha$-aminoadipic acid or sodium dithionite to fermentation media composed of complex organic or chemically defined nutrients. The antibiotic which is produced by growing newly found strains of Streptomyces on suitable fermentation media is active against both gram-positive and gram-negative bacteria.

15 Claims, No Drawings

FERMENTATION PROCESS

DESCRIPTION OF THE PREFERRED EMBODIMENTS

This is a Continuation-in-Part of applicants' copending application Ser. No. 145,558, filed May 20, 1971 and now abandoned.

This invention relates to the production of a new and useful antibiotic known chemically as 7-(D-5-amino-5-carboxyvaleramido)-3-(carbamoyloxymethyl)-7-methoxy-3-cephem-4-carboxylic acid, and, in particular, to an improved method for the production of the antibiotic by fermentation of nutrient media with suitable strains of microorganisms such as, for example, Streptomyces.

The antibiotic is produced during the aerobic fermentation of suitable aqueous nutrient media under controlled conditions. Aqueous media such as those employed for the production of other antibiotics are suitable. Such media contain sources of carbon and nitrogen which are assimilable by the microorganism, and inorganic salts. In addition, the fermentation media contain traces of metals necessary for the growth of the microorganism which are commonly supplied as impurities incidental to the other constituents of the medium. In general, carbohydrates such as sugars, for example, sucrose, maltose, fructose lactose, and the like, and starches such as grains, for example, oats and rye, corn starch, corn meal and the like can be used either alone or in combination as sources of assimilable carbon. The exact amount of the carbohydrate source or sources utilized in the medium will depend in part upon the other ingredients. It has been found, however, than an amount of carbohydrate between about 1 and 6% by weight of the medium is sufficient. A single carbon source may be used, or several carbon sources may be combined.

Satisfactory nitrogen sources include myriad proteinaceous materials such as various forms of hydrolysates of casein, soybean meal, corn steep liquor, distillers solubles, yeast products, tomato paste, and the like. The various sources of nitrogen can be used either alone or in combination, and are used in amounts ranging from 0.2–6 percent by weight of the aqueous medium.

The fermentation is carried out at temperatures ranging from 20°C. to 37°C.; however, for optimum results, it is preferable to conduct the fermentation at temperatures of from about 24°C. to 32°C. The pH of the nutrient mediums suitable for growing the Streptomyces cultures and producing the antibiotic should be in the range of from about 6.0 to 8.0.

7-(D-5-amino-5carboxyvaleramido)-3-(carbamoyloxymethyl)-7-methoxy-3-cephem-4-carboxylic acid having Formula I below is produced during the aerobic fermentation described above by a strain of *Streptomyces lactamdurans* and *Streptomyces clavuligerus* capable of producing said compound as, for example, by the strains on unrestricted permanent deposit in the culture collection of the Northern Utilization Research and Development Branch of the U.S. Department of Agriculture at Peoria, Illinois under accession numbers NRRL 3802 and NRRL 3585, respectively. Other strains of this species, such as mutants obtained by mutating agents or isolated from nature, can also be used.

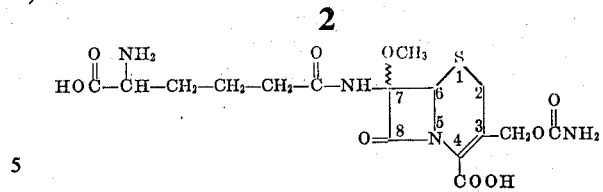

I

This compound is amphoteric with an apparent isoelectric point of about pH 3.5, and is stable in solution at a pH range of about 1.5–9.0.

The antibiotic compound of Formula I above and its salts demonstrate resistance not only to penicillinase but to the cephalosporinases as well. This compound is active in inhibiting the growth of gram-positive and gram-negative microorganisms and exhibits an enhanced activity against gram-negative microorganisms. Unlike cephalosporin C which has a relatively low antibacterial activity, the products of this invention exhibit a significant in vivo gram-negative effect with a potency which, in general, is greater than cephalothin. This activity includes effectiveness in vivo on *Proteus morganii* and, in addition, an effectiveness against the following gram-negative bacteria: *Escherichia coli*, *Proteus vulgaris*, *Proteus mirabilis*, *Salmonella schottmuelleri*, *Klebsiella pneumoniae AD*, *Klebsiella pneumoniae B*, and *Paracolobactrum arizonae*.

Bioassays for this antibiotic are run by a discplate procedure using ⅜ inch filter paper discs. The assay plates are prepared using Difco nutrient agar plus 2.0 g./l. Difco yeast extract at 10 ml. per plate. An overnight growth of the assay organism, *Vibrio percolans* ATCC 8461 is diluted in sterile saline solution to a suspension having 40 percent transmittance at a wave length of 660 m$\mu$. This suspension is added at 20 ml./liter of medium prior to pouring the plates.

The assay plates are held at 4°C. until used (5 day maximum). Following the application of the antibiotic-saturated assay discs the plates are incubated at 28°C. for a period of from 8 to 24 hours. Zones of inhibition are read as mm. diameter. They are used to determine relative potencies or, when compared with a purified reference standard, the potency in $\mu$g./ml.

Due to the inherent difficulty in separating pure 7-(D-5-amino-5-carboxyvaleramido)-3-(carbamoyloxymethyl)-7-methoxy-3-cephem-4-carboxylic acid from the large quantities of impurities in the fermentation broth, it is of great importance to find a way to increase the concentration of the antibiotic relative to the total broth solids.

It is, therefore, an object of this invention to provide a method of increasing the yield of antibiotic in a fermentation process. It is a further object of the invention to provide a method of increasing the yield of an antibiotic using relatively inexpensive, readily available chemical additives in the fermentation process. Further objects of the invention will become apparent.

It has been discovered that the addition of sodium thiosulfate ($Na_2S_2O_3$), sodium dithionite ($Na_2S_2O_4$), $\alpha$-amino-adipic acid or the combined addition of sodium thiosulfate and $\alpha$-aminoadipic acid to complex organic and chemically defined fermentation media will enhance the production 7-(D-5-amino-5-carboxyvaleramido)-3-(carbamoyloxymethyl)-7-methoxy-3-cephem-4-carboxylic acid.

By "complex organic" media is meant media wherein some of the ingredients are not chemically defined. An example of such media is one consisting of Crescent brand oats, soybean meal, sodium citrate, a defoamer and distillers solubles. By "chemically defined" or "synthetic" media is meant media in which all of the ingredients are chemically defined. An example of such media is one consisting of corn starch, potassium acid phosphate, sodium citrate, asparagine, methionine, monosodium glutamate, calcium chloride, magnesium sulfate and ferric sulfate.

The amount of the sodium thiosulfate and/or α-amino-adipic acid or sodium dithionite needed to stimulate production of the antibiotic is dependent upon both the culture and the medium employed. In the case of the *Streptomyces lactamdurans* culture an increase in production of the antibiotic has been observed in synthetic media containing from 0.005–1.6 percent (weight/volume) of either additive. It is preferred, however, to employ from about 0.1–0.8 percent in order to obtain good production of the antibiotic. Optimum yields are obtained at a level of 0.3–0.5 percent with particularly good yields at 0.4 percent. The addition of sodium dithionite or sodium thiosulfate to a synthetic or chemically defined medium with *Streptomyces lactamdurans* will increase the production of 7-(D-5-amino-5-carboxyvaleramido)-3-(carbamoyloxymethyl)-7-methoxy-3-cephem-4-carboxylic acid by as much as 91–105 percent when sodium thiosulfate is present in a concentration of 0.4 percent. Concentrations greater than 1.6% of sodium thiosulfate or sodium dithionite tend to decrease production of antibiotic in the media.

Correspondingly, in a complex organic nutrient medium using *Streptomyces lactamdurans*, the optimum yields of antibiotic are observed at a level of 0.05–0.1 percent of sodium thiosulfate or sodium dithionite.

We have also found that the combination of sodium thiosulfate and DL-α-aminoadipic acid with *Streptomyces lactamdurans* stimulates production of the antibiotic in both synthetic and complex media. The amount of sodium thiosulfate is as disclosed above with DL-α-aminoadipic acid added in amounts ranging from 0.005–0.15 percent (weight/volume). Preferably the DL-α-aminoadipic acid is added at about 0.01 percent (weight/volume) with the combined optimal levels of sodium thiosulfate and DL-α-aminoadipic acid being about 0.4 and 0.01 percent, respectively. The improvement in yield is most remarkable in the synthetic medium, although yields in the complex organic medium are also increased over corresponding control fermentations.

Surprisingly, when the culture employed is *Streptomyces lactamdurans*, the time of addition of the yield-increasing additives to the fermentation batch is critical. Thus, if the addition of sodium thiosulfate and/or DL-α-amino-adipic acid or sodium dithionite takes place 24–48 hours after inoculation optimum yields are obtained. However, if the addition takes place earlier in the fermentation process, either no enhancement or an inhibitory effect is observed.

By contrast, when the culture employed is *Streptomyces clavuligerus* and the additive is sodium thiosulfate, neither the time of addition or the concentration of said additive is critical. In general, sodium thiosulfate stimulates antibiotic production by an average of about 40 percent regardless of whether the additive is included at the beginning of the fermentation or after inoculation. However, especially good yields of antibiotic have been obtained with this additive at concentrations of from about 0.20 to about 0.60 percent (weight/volume).

When sodium dithionite is used and the culture is *Streptomyces clavuligerus* the time of addition is critical. Dithionite stimulates antibiotic synthesis when the additions are made several hours after inoculation, usually 24–31 hours post-inoculation, but the growth of the organism is inhibited when the compound is added at the beginning of the fermentation. In general, 0.005 to 0.075 percent (weight/volume) of dithionite may be used with good results but particularly good yields of antibiotic are obtained when this compound is added to the production medium within 24–31 hours after inoculation at concentrations of from about 0.025 to 0.050 percent.

Also, when *Streptomyces clavuligerus is used the combined addition of from about* 0.005 to about 0.6 percent thiosulfate and from about 0.01 to about 0.4 percent L-α-aminoadipic acid generally stimulates antibiotic production to an even greater degree than with thiosulfate alone. In this regard 0.20% sodium thiosulfate and 0.05% L-α-aminoadipic acid (weight/volume) was found to be particularly suitable in stimulating antibiotic production when added at the beginning of the fermentation process.

When L-α-aminoadipic acid is used alone with the *Streptomyces clavuligerus* culture it has been found that from about 0.01 percent (weight/volume) to about 0.4 percent of the additive stimulates antibiotic production. However, a preferred range of from about 0.025 to about 0.05 percent affords especially good yields.

The media to which the thiosulfate, dithionite and α-aminoadipic acid compound are added can be any suitable aqueous nutrient media; however, certain media when used in combination with these additives yield particularly good amounts of the antibiotic. Thus, surprisingly, the *Streptomyces clavuligerus* culture has been found to afford maximum yields in the following medium:

MEDIUM I

Starch—4.8%
Distiller's Solubles—0.5%
Soya Bean Grits—0.21%
Glycerol—0.8%
Hydrolyzed Casein (*N-Z Amine, Type A)—0.5%
Ferrous Sulfate Heptahydrate—0.01%
Tap Water—1.0 liter

*N-Z Amine, Type A: an enzyme digest of casein; product of the Sheffield Chemical Co., Norwich, New York.

whereas, the *Streptomyces lactamdurans* culture affords especially good yields of antibiotic in Medium II infra:

MEDIUM II

Distiller's Solubles—3.0%
Primary Dried Yeast—1.0%
Mobile par-S Defoamer—0.25%
Glycine—0.05%
L-phenylalanine—0.30%
Cornstarch—2.0%
Deionized Water—1.0 liter The above discussion is primarily directed to fermentations using a particular strain of the *Streptomyces lactamdurans* and *Streptomyces clavuligerus* cultures. However, other strains of these organisms such as mutants can also be used to produce the antibiotic and it should be obvious to one skilled in the art that sodium thiosulfate, sodium dithionite or the combination of sodium thiosulfate and DL- or L-α-aminoadipic acid can be used to increase the antibiotic yield, when added to fermentation batches containing such strains. Following the teaching of this invention obvious modifications or changes in the optimal levels of the additive or the time of addition to the fermentation medium, etc., will be within the skill of the artisan, no matter which strain of *Streptomyces lactamdurans* or *Streptomyces clavuligerus* is used to produce the antibiotic 7-(D-5-amino-5-carboxyvaleramido)-3-(carbamoyloxymethyl)-7-methoxy-3-cephem-4-carboxylic acid.

Although the new antibiotic of this invention is produced by both surface and submerged cultures, it is presently preferred to carry out the fermentation in the submerged state. Small scale fermentations are conveniently carried out by placing suitable quantities of nutrient medium in flasks, sterilizing the flasks and contents by heating to 120°C., inoculating the flasks with either spores or a vegetative cellular growth of a 7-(D-5-amino-5-carboxyvaler-amino)-3-(carbamoyloxymethyl)-7-methoxy-3-cephem-4-carboxylic acid producing strain of Streptomyces, loosely stoppering the necks of the flasks with cotton, and permitting the fermentation to proceed at a constant temperature of about 28°C. on a shaker for 3–5 days. For larger scale work, it is preferable to conduct the fermentation in suitable tanks provided with an agitator and a means for aerating the fermentation medium. In this method, the nutrient medium is made up in the tank and sterilized by heating at 120°C. After cooling the sterilized medium is inoculated with a suitable source of vegetative cellular growth of the Streptomyces culture and the fermentation is permitted to proceed for 2–4 days while agitating and/or aerating the nutrient mediun and maintaining the temperature at about 28°C. This method of producing 7-(D-5-amino-5-carboxyvaleramido)-3-(carbamoyloxymethyl)-7-methoxy-3-cephem-4-carboxylic acid is particularly suited for the preparation of large quantities of this new antibiotic.

The fermentation using the 7-(D-5-amino-5-carboxyvaleramido)-3-(carbamoyloxymethyl)-7-methoxy-3-cephem-4-carboxylic acid-producing microorganism can be carried out at temperatures ranging from about 20°–37°C. For optimum results, however, it is most convenient to conduct the fermentation at temperatures between 26°–30°C. The pH of the nutrient media suitable for growing the Streptomyces and producing the antibiotic may vary from about 5 to 9. The preferred pH range, however, is from about 6.0 to 7.5.

In carrying out the invention, a cell suspension is prepared by the addition of sterile medium to an agar slant culture of the 7-(D-5-amino-5-carboxyvaleramido)-3-(carbamoyloxymethyl)-7-methoxy-3-cephem-4-carboxylic acid-producing microorganism. Growth from the slant culture is then used to inoculate a seed flask and the seed flask is shaken at about 28°C. for 1–3 days in order to obtain good growth. The seed flask is then used to inoculate the production flasks. Alternatively, the seed flask can be inoculated from a lyophilized culture or a frozen inoculum.

The inoculation is generally carried out using about 1 ml. per 40 ml. of production medium. The desired concentration of additive is then added to the production flasks after the necessary time period of waiting and the fermentation is permitted to proceed for 2–4 days while agitating and/or aerating the nutrient medium and maintaining the temperature at about 28°C. All of the production flasks, i.e., those containing additives and the flasks used as controls, are then assayed, generally after 96 hours, to determine the amount of antibiotic produced in each flask.

The antibiotic 7-(D-5-amino-5-carboxyvaleramido)-3-(carbamoyloxymethyl)-7-methoxy-3-cephem-4-carboxylic acid is conveniently assayed by means of a disc-plate procedure using *Vibrio percolans* ATCC 8461 as the assay organism. Discs of ⅜ inch diameter were used. Activity of antibiotic is expressed in terms of $\mu$g. per ml. of the free acid. A standard curve is prepared from known concentration solutions of the antibiotic.

The production flasks are then assayed by diluting the sample in .02 molar phosphate buffer at pH 7 to an appropriate concentration. The test organism is *Vibrio percolans* ATCC 8461, and the assay medium is Difco nutrient agar plus 0.2 percent Difco yeast extract. The discs are dipped into 5 $\mu$g. per milliliter of the standard antibiotic solution and are placed on the plate in a position alternate to the sample. The plates are then incubated at 37°C. for 18 hours, and the zone diameters in millimeters are determined. Five standard plates containing 4 levels of the standard ranging from 2.5 $\mu$g./ml. to 20 $\mu$g/ml. are employed. The assay is calculated by means of a Nomograph, and the results are reported in terms of $\mu$g. per milliliter of the free acid.

The antibiotic can be recovered from the fermentation medium by a number of procedures. The filtered broth can be passed through one or more ion exchange columns. The amphoteric nature of the antibiotic enables selection of both cationic and anionic ion exchange resins to optimize recovery. The adsorbed antibiotic can then be removed by elution, preferably in a volatile solvent such as pyridine which can be easily removed.

The following examples are given for purposes of illustration and not by way of limitation.

EXAMPLE 1

To an agar slant culture of *Streptomyces lactamdurans* NRRL 3802 was added 10 ml. of sterile skimmed milk. The skimmed milk suspension is lyophilized in individual sterile tubes containing 0.1–0.2 ml. of the suspension, and the freeze-dried culture is used to inoculate a 250 ml. baffled Erlenmeyer flask containing 40 ml. of a seed medium containing 1 percent primary yeast in distilled water.

The seed flask is incubated at 28°C. for two days on a 220 rpm rotary shaker with a 2-inch throw. For the second seed stage, 1.0 ml. of the above culture was added to a synthetic medium of the same composition as the synthetic production medium and incubated as above for 2 days.

To each of eight 250 ml. Erlenmeyer flasks containing 40 ml. of sterile medium of the following composition:

SYNTHETIC PRODUCTION MEDIUM

Glucose—1.0%
Monosodium Glutamate—0.425%
Potassium Dibasic Phosphate—0.2%
Ammonium Chloride—0.1%
NaCl—0.05%

MgSO$_4$ · 7H$_2$O—0.05%
CaCO$_3$—0.025%
i-Inositol—0.02%
FeSO$_4$ · 7H$_2$O—0.0025%
ZnSO$_4$ · 7H$_2$O—0.001%
MnSO$_4$ · H$_2$O—0.0005%
Para-aminobenzoic Acid—0.000001% in water volume, pH = 7.0, was added 1.0 ml. of the second seed stage prepared as described above. After 30 hours of incubation an aqueous solution was prepared containing sufficient Na$_2$S$_2$O$_4$ (sodium dithionite) or Na$_2$S$_2$O$_3$ (sodium thiosulfate) to result in a final concentration of 0.1 percent and this solution was distributed to each of six flasks. Incubation was then allowed to progress for an additional 66 hours at 28°C., on a rotary shaker operating at 220 rpm with a 2-inch throw. The contents of each flask was centrifuged at 8500 rpm for 3 minutes and the broth decanted from the solids. The supernatant broths were assayed using *Vibrio percolans* as the test organism. The assays of the broths are shown below:

| Experiment | Flask | Additive | Free Acid Production µg/ml. |
|---|---|---|---|
| 1 | 1(control) | None | 36 |
| | 2 | 0.1% Na$_2$S$_2$O$_3$ | 56 |
| | 3 | 0.1% Na$_2$S$_2$O$_4$ | 50 |
| 2 | 1(control) | None | 40 |
| | 2 | 0.1% Na$_2$S$_2$O$_3$ | 54 |
| | 3 | 0.1% Na$_2$S$_2$O$_4$ | 56 |

EXAMPLE 2

Flasks containing medium and microorganism seed, prepared as in Example 1, were given the following percentage of Na$_2$S$_2$O$_3$ after 30 hours of incubation. After an additional 66 hours of incubation, the broth was assayed as described above to yield the following results:

| Flask | Amount of Na$_2$S$_2$O$_3$ | Free acid production µg/ml. |
|---|---|---|
| 1 (control) | None | 33 |
| 2 | 0.05% | 51 |
| 3 | 0.10% | 57 |
| 4 | 0.20% | 59 |
| 5 | 0.40% | 62 |
| 6 | 0.80% | 56 |
| 7 | 1.2% | 51 |
| 8 | 1.6% | 43 |

EXAMPLE 3

The following fermentation is carried out, using the same general procedures described above, but varying the time at which the Na$_2$S$_2$O$_3$ is added, or the amount of added Na$_2$S$_2$O$_3$, to illustrate the optimum conditions for increased production:

| Additions | FREE ACID PRODUCTION µg/ml. Amount of Na$_2$S$_2$O$_3$ Addition (%) | | | | | |
|---|---|---|---|---|---|---|
| | None | 0.05 | 0.10 | 0.2 | 0.4 | 0.8 |
| 1. None (control) | 39 | | | | | |
| Na$_2$S$_2$O$_3$ at | | | | | | |
| 2. 0 hr. | | 34 | 0 | 0 | 0 | 0 |
| 3. 30 hr. | | 70 | 74 | 70 | 84 | 73 |

| Additions | FREE ACID PRODUCTION µg/ml. Amount of Na$_2$S$_2$O$_3$ Addition (%) | | | | | |
|---|---|---|---|---|---|---|
| | None | 0.05 | 0.10 | 0.2 | 0.4 | 0.8 |
| 4. None (control) | 28 | | | | | |
| Na$_2$S$_2$O$_3$ at | | | | | | |
| 5. 0 hr. | | 12 | 0 | 0 | 0 | 0 |
| 6. 30 hr. | | 49 | 45 | 49 | 54 | 45 |

| | TIME OF Na$_2$S$_2$O$_3$ ADDITION (Hours) | | | | | |
|---|---|---|---|---|---|---|
| | None | 24 | 30 | 48 | 54 | 72 |
| 7. None (control) | 43 | | | | | |
| 8. 0.4% Na$_2$S$_2$O$_3$ | | 33 | 74 | 71 | 48 | 44 |
| 9. None (control) | 52 | | | | | |
| 10. 0.4% Na$_2$S$_2$O$_3$ | | 10 | 60 | 80 | 79 | 47 |

EXAMPLE 4

The following fermentation was carried out to illustrate the advantage of using the combination of Na$_2$S$_2$O$_3$ and DL-α-aminoadipic acid (AAA) as an addition to the fermentation media described above.

| Experiment | Flask | Additions at 30 hour. | Free Acid Production µg/ml. |
|---|---|---|---|
| 1 | 1 | None (control) | 43 |
| | 2 | 0.4% Na$_2$S$_2$O$_3$ | 74 |
| | 3 | 0.4% Na$_2$S$_2$O$_3$ + 0.01% AAA | 120 |
| 2 | 1 | None (control) | 33 |
| | 2 | 0.4% Na$_2$S$_2$O$_3$ | 50 |
| | 3 | 0.4% Na$_2$S$_2$O$_3$ + 0.01% AAA | 82 |
| 3 | 1 | None (control) | 30 |
| | 2 | 0.4% Na$_2$S$_2$O$_3$ | 57 |
| | 3 | 0.1% AAA | 32 |
| | 4 | 0.4% Na$_2$S$_2$O$_3$ + 0.01% AAA | 65 |
| 4 | 1 | None (control) | 35 |
| | 2 | 0.4% Na$_2$S$_2$O$_3$ | 58 |
| | 3 | 0.01% AAA | 35 |
| | 4 | 0.4% Na$_2$S$_2$O$_3$ + 0.01% AAA | 84 |

EXAMPLE 5

The following studies were made with a complex organic medium as the fermentation medium. The seed medium is prepared as described in Example 1. A 2.5 percent inoculum from the first seed stage was added to a second seed stage flask containing 2 percent Fleishman S-150 yeast autolysate, pH 7.0.

After 48 hours incubation in the second seed stage, 1 ml. is used to inoculate each flask containing 40 ml. of the complex organic medium. This medium has the following composition:

COMPLEX ORGANIC MEDIUM

Primary Dried Yeast—10 g.
Distiller's Solubles—30 g.
Glycine—0.5 g.
L-Phenylalanine—3 g.
Cornstarch—20 g.
Mobile par-S Defoamer—2.5 ml.
Distilled Water pH is adjusted to 7.5—1000 ml.

Addition in the indicated amounts were made to the media. Total fermentation time was 96 hours, and the assay was as previously described.

The results were as follows:

| Flask | Additions | 842A Production µg/ml. ADDITION TIME (HR.) | | | |
|---|---|---|---|---|---|
| | | None | 0 | 24 | 48 | 72 |
| 1 | Control | 183 | | | | |
| 2 | 0.005% Na$_2$S$_2$O$_3$ | | 180 | 233 | 171 | 175 |
| 3 | 0.01% Na$_2$S$_2$O$_3$ | | 208 | 230 | 222 | 191 |
| 4 | 0.05% Na$_2$S$_2$O$_3$ | | 226 | 256 | 241 | 176 |
| 5 | | | | | | |
| 6 | 0.10% Na$_2$S$_2$O$_3$ | | 217 | — | 241 | 184 |

EXAMPLE 6

ADDITION OF SODIUM THIOSULFATE; MODIFIED FERMENTATION PROCESS

Step A: Slants

A lyophilized tube of Streptomyces clavuligerus culture (NRRL 3585) was opened aseptically and the organism transferred to agar slants of the following composition:

Dextrin—10.0 g.
Yeast Extract—1.0 g.
Hydrolyzed Casein (N-Z Amine, Type A)—2.0 g.
Beef Extract—1.0 g.
Agar—20.0 g.
Deionized Water—1.0 liter The pH of this medium was adjusted to 7.0 by the addition of sodium hydroxide. The slants were then incubated for seven days at 28°C. and stored in the cold.

Step B: Seed System

The slant culture of Step A was used to inoculate 100 ml. of seed medium of the following composition:

Glucose—15.0 g.
Soya Bean Meal—15.0 g.
Corn Steep Liquor Solids—5.0 g.
Calcium Carbonate—2.0 g.
Sodium Chloride—5.0 g.
Deionized Water—1.0 liter This medium was adjusted to pH 6.7 by the addition of sodium hydroxide. The seed medium was then incubated at 28°C. and shaken on a gyrotory shaker having a 2-inch thrust at 220 rpm for 48 hours.

Step C: Antibiotic Production

An inoculum (1.0 ml.) from the seed stage was used to inoculate 40 ml. of production medium in 250 ml. Erlenmeyer flasks. This medium had the following composition:

MEDIUM I

Starch—4.8%
Distiller's Solubles—0.5%
Soya Bean Grits—2.1%
Glycerol—0.8%
Hydrolyzed Casein (N-Z Amine, Type A)—0.5%
Ferrous Sulfate Heptahydrate—0.01%
Tap Water—1.0 liter This solution was adjusted to pH 6.5 with sodium hydroxide, dispensed into 250 ml. Erlenmeyer flasks and sterilized by heating for 15–20 minutes at 120°C. and 15 psi. Incubation was for four days at 28°C. on a 220 rpm rotary shaker with a 2-inch thrust.

When the fermentation was complete the cells were removed by centrifugation and the broth was diluted with phosphate buffer, pH 7.0. The concentration of 7-(D-5-amino-5-carboxyvaleramido)-3-(carbamoyloxymethyl)-7-methoxy-3-cephem-4-carboxylic acid in the fermentation broth was determined by the standard biological-disc assay method. The assay organism employed was Vibrio percolans (ATCC 8461). Filter paper discs were immersed in the diluted broths and placed on the surface of agar-containing Petri dishes that had been inoculated with the assay organism Vibrio percolans (ATCC 8461). Also placed on these Petri dishes were discs that had been dipped previously in standard solutions containing known concentrations of the antibiotic. The discs were incubated overnight at 28°C. and the diameters of the zones of inhibition recorded. The concentration of antibiotic in the fermented broth was calculated by interpolation from the standard curve which relates zone diameter with the known concentrations of standard antibiotic solutions. By this procedure it was calculated that Streptomyces clavuligerus NRRL 3583 produced an average of 749 μg/ml. of 7-(D-5-amino-5-carboxyvaleramido)-3-(carbamoyloxymethyl)-7-methoxy-3-cephem-4-carboxylic acid in the basal production medium.

Step D: Addition of Sodium Thiosulfate

The addition of sodium thiosulfate to Medium I in Step C, supra, increased the yield of 7-(D-5-amino-5-carboxyvaleramido)-3-(carbamoyloxymethyl)-7-methoxy-3-cephem-4-carboxylic acid significantly. Table I below indicates the extent of this increase over a range of concentrations. The control was conducted in the manner described in Steps A–C above and the remaining experiments were conducted in an identical manner but with the addition of the indicated amounts of sodium thiosulfate over a period of from zero to 48 hours. By "zero" hour we mean that sodium thiosulfate was added at about the time of inoculation with the seed from Step B. The assays were conducted in the same manner as in Step C.

TABLE I

| Experiment | Flask | Time of Addition | Thiosulfate Added | Antibiotic Production (μg/ml.) |
|---|---|---|---|---|
| 1 | 1 | Control | None | 721 |
|   | 2 | 0 hr. | 0.10% | 865 |
|   | 3 | 24 hr. | 0.10% | 828 |
| 2 | 1 | Control | None | 755 |
|   | 2 | 0 hr. | 0.10% | 991 |
|   | 3 | 0 hr. | 0.20% | 1163 |
|   | 4 | 0 hr. | 0.40% | 856 |
|   | 5 | 40 hr. | 0.10% | 1120 |
|   | 6 | 48 hr. | 0.10% | 1095 |
| 3 | 1 | Control | None | 748 |
|   | 2 | 0 hr. | 0.10% | 936 |
|   | 3 | 0 hr. | 0.20% | 845 |
|   | 4 | 0 hr. | 0.40% | 1023 |
| 4 | 1 | Control | None | 658 |
|   | 2 | 0 hr. | 0.10% | 945 |
|   | 3 | 0 hr. | 0.20% | 1154 |
|   | 4 | 0 hr. | 0.40% | 1150 |
|   | 5 | 0 hr. | 0.60% | 1162 |
| 5 | 1 | Control | None | 891 |
|   | 2 | 0 hr. | 0.10% | 1211 |
|   | 3 | 0 hr. | 0.20% | 1291 |
|   | 4 | 0 hr. | 0.40% | 1133 |
| 6 | 1 | Control | None | 766 |
|   | 2 | 0 hr. | 0.20% | 995 |

The results of Table I show that the addition of sodium thiosulfate stimulated antibiotic production by an average of 40 percent in 6 experiments. Neither the time of addition nor the concentration of thiosulfate appears critical.

EXAMPLE 7

ADDITION OF SODIUM THIOSULFATE AND/OR L-α-AMINOADIPIC ACID

In this experiment the procedure of Example 6 was repeated except that the following concentrations of L-α-aminoadipic acid alone and sodium thiosulfate in combination with L-AAA were substituted for the concentrations of sodium thiosulfate recited therein. The additions were made to the inoculum of Example 6, Step C prior to incubation.

TABLE II

| Flask No. | %Na$_2$S$_2$O$_3$ and L-AAA | Antibiotic Production (µg/ml) |
|---|---|---|
| 1 | None (Control) | 766 |
| 2 | 0.025% L-AAA | 833 |
| 3 | 0.050% L-AAA | 880 |
| 4 | 0.20% Na$_2$S$_2$O$_3$ | 995 |
| 5 | 0.20% Na$_2$S$_2$O$_3$ + 0.025% L-AAA | 1051 |
| 6 | 0.20% Na$_2$S$_2$O$_3$ +0.05% L-AAA | 1195 |

These results show that the combined addition of sodium thiosulfate and L-α-aminoadipic acid (L-AAA) stimulate the production of the antibiotic 7-(D-5-amino-5-carboxyvaleramido)-3-(carbamoyloxymethyl)-7-methoxy-3-cephem-4-carboxylic acid to a greater degree than sodium thiosulfate alone. The addition of a mixture of 0.20% Na$_2$S$_2$O$_3$ and 0.05% L-α-aminoadipic acid was judged most effective in increasing the yield of 7-(D-5-amino-5-carboxyvaleramido)-3-(carbamoyloxymethyl)-7-methoxy-3-cephem-4-carboxylic acid.

EXAMPLE 8

ADDITION OF SODIUM DITHIONITE

The procedure of Example 6 was repeated except that sodium dithionite (Na$_2$S$_2$O$_4$) was substituted for sodium thiosulfate in Step D. The following table indicates the concentrations at which sodium dithionite was employed and the increase in yield of antibiotic attributed thereto.

TABLE III

| % Na$_2$S$_2$O$_4$ | Time of Addition (hours) | Antibiotic Production (µg/ml) |
|---|---|---|
| None (Control) | 0 | 703 |
| 0.025 | 0 | 0 |
| 0.050 | 0 | 0 |
| 0.025 | 24 | 835 |
| 0.050 | 24 | 763 |
| 0.025 | 31 | 793 |
| 0.050 | 31 | 738 |

These results show that sodium dithionite stimulated antibiotic synthesis when the additions were made 24–31 hours post-inoculation; however, when the compound was added at the beginning of the fermentation the growth of the organism was inhibited.

What is claimed is:

1. In the process for preparing 7-(D-5-amino-5-carboxyvaleramido)-3-(carbamoyloxymethyl)-7-methoxy-3-cephem-4-carboxylic acid by growing a new strain of Streptomyces selected from *streptomyces lactamdurans*, *streptomyces clavuligerus* or a mutant thereof in a nutrient medium; the improvement which comprises adding alone or in combination sodium thiosulfate, sodium dithionite or α-aminoadipic acid to the nutrient medium.

2. The process of claim 1 wherein the sodium dithionite or sodium thiosulfate is added within 24–48 hours after inoculation with the *Streptomyces lactamdurans* culture.

3. The process of claim 2 in which the additive is sodium thiosulfate.

4. The process of claim 3 in which DL-α-aminoadipic acid is added to the medium in addition to sodium thiosulfate.

5. The process of claim 4 in which the DL-α-aminoadipic acid is added in the amount of from about 0.005–0.015 percent (weight/volume).

6. In the process for preparing 7-(D-5-amino-5-carboxyvaleramido)-3-(carbamoyloxymethyl)-7-methoxy-3-cephem-4-carboxylic acid, which comprises inoculating an aqueous complex organic medium with *Streptomyces lactamdurans*, and growing the same under aerobic conditions until substantial antibiotic activity is imparted to the medium; the improvement which comprises adding 0.05–0.1 percent of sodium thiosulfate (weight/volume) to the medium within 24–48 hours after inoculation with the *Streptomyces lactamdurans* culture.

7. The process of claim 6 in which the sodium thiosulfate is added at a level of 0.1% to the complex organic medium.

8. In the process for preparing 7-(D-5-amino-5-carboxyvaleramido)-3-(carbamoyloxymethyl)-7-methoxy-3-cephem-4-carboxylic acid by inoculating a nutrient medium with *Streptomyces clavuligerus;* the improvement which comprises adding sodium thiosulfate, sodium dithionite, α-aminoadipic acid or a combination of sodium thiosulfate and α-aminoadipic acid to the said medium.

9. The process of claim 8 wherein the concentration of sodium thiosulfate is from about 0.005 to about 0.6 percent and the concentration of L-α-aminoadipic acid is from about 0.01 to about 0.4 percent.

10. The process of claim 8 wherein 0.01-0.4% L-α-aminoadipic acid is added to the nutrient medium prior to inoculation.

11. The process of claim 8 wherein sodium thiosulfate is added to the nutrient medium.

12. The process of claim 8 wherein sodium dithionite is added to the nutrient medium at about 24–31 hours after inoculation.

13. The process of claim 12 wherein from about 0.005 to about 0.075 percent of sodium dithionite is employed.

14. The process of claim 8 wherein the combined addition of sodium thiosulfate and L-α-aminoadipic is added to the nutrient medium at about the time of inoculation with the Streptomyces clavuligerus culture.

15. The process of claim 14 wherein 0.20 percent sodium thiosulfate and 0.05 percent Lα-aminoadipic acid is added to the nutrient medium prior to inoculation.

* * * * *